United States Patent Office 3,660,432
Patented May 2, 1972

3,660,432
RESOLUTION OF (±)(CIS-1,2-EPOXYPROPYL)-PHOSPHONIC ACID
Raymond A. Firestone, Fanwood, N.J., assignor to Merck & Co., Inc., Rahway, N.J.
No Drawing. Filed Apr. 14, 1969, Ser. No. 816,042
Int. Cl. C07f 9/38
U.S. Cl. 260—348 R                2 Claims

ABSTRACT OF THE DISCLOSURE (—)(Cis-1,2-expoxypropyl)-phosphonic acid, a potent antibacterial agent, is separated from a racemic mixture of the free acids by a direct resolution technique.

---

This invention relates to a process for resolving a racemic mixture of epoxy-phosphonic acids into its enantiomers. More particularly, it is concerned with the direct resolution of a racemic mixture of (±)(cis-1,2-epoxypropyl)-phosphonic acid into the potent antibiotically active (—) enantiomer.

Although many valuable antibiotics are known for the treatment of various diseases, such antibiotics are in general active against a limited number of pathogens and certain strains of these pathogens develop resistance to a particular antibiotic so that the antibiotic is no longer active against such resistant strains. These shortcomings of the known antibiotics have stimulated further research to discover new antibacterial agents which are active against a wide range of pathogens and against pathogens resistant to previously described antibiotics.

It has been discovered that (—)(cis-1,2-epoxypropyl)-phosphonic acid is a useful antimicrobial agent, which is active in inhibiting the growth of both gram-positive and gram-negative pathogenic bacteria. Salts of (—)(cis-1,2-epoxypropyl)-phosphonic acid are useful in the treatment of diseases caused by bacterial infections in man and animals and are particularly valuable in this respect, since they are active against resistant strains of pathogens. (—) (Cis-1,2-epoxypropyl)-phosphonic acid can be used as an antiseptic agent to remove susceptible organisms from pharmaceutical, dental, and medical equipment and other areas subject to infection by bacterial organisms. Similarly, it can be used to separate certain microorganisms from mixtures of microorganisms.

The potent antibiotic (—)(cis-1,2-epoxypropyl)-phosphonic acid has been prepared by fermentation of certain strains of streptomyces. The racemic mixture (±)(cis-1,2-epoxypropyl)-phosphonic acid can be prepared by several routes, one of which is by epoxidation of cis-propenyl-phosphonic acid. The greater antibiotic activity resides in (—)(cis-1,2-epoxypropyl)-phosphonic acid so that this acid possesses essentially twice the antibacterial activity (on a weight basis) of the (±)(cis-1,2-epoxypropyl)-phosphonic acid compounds.

One object of the present invention is the direct resolution of racemic (±)(cis-1,2-epoxypropyl)-phosphonic acid into the (—) enantiomer.

The present invention is based upon applicant's discovery that (±)(cis-1,2-epoxypropyl)-phosphonic acid can be separated directly into (+) and (—) enantiomers by selective crystallization of one enantiomer using appropriate crystallization solvents and temperature conditions.

Direct resolution of (±)(cis-1,2-epoxypropyl)-phosphonic acid into the (+) and (—) enantiomers is accomplished by dissolving a racemic mixture of the free acids in an ether solvent at 0° C. and then adding to the resulting solution a miscible, non-solvent to the cloud point of the mixture. At this point, the solution is seeded with crystalline (—)(cis-1,2-epoxypropyl)-phosphonic acid, and the entire solution cooled to below 0° C. with rapid stirring. The (—) enantiomer crystallizes and is recovered by filtration and other known techniques. The (+) enantiomer remains in solution and may be recovered therefrom by known techniques.

In the practice of this invention selection of the proper solvent non-solvent system is an important consideration. The solvent system employed should be capable of dissolving the racemic mixture of free acids and permit separation of (—) enantiomer. The racemic mixture must be soluble in the solvent at 0° C. and below. The solvents which have been found most useful are the ethers, tetrahydrofuran and dioxane and mixtures thereof.

The second component of the resolution solvent system is a liquid which is miscible with the ethereal solvent and which is a non-solvent for the (—) enantiomer. Diethyl ether is a suitable non-solvent in this process. The non-solvent is added to the cloud point of the solvent system at 0° C.

Separation of the (—) enantiomer of (±)(cis-1,2-epoxypropyl)-phosphonic acid is accomplished by adding seed crystals of (—)(cis-1,2-epoxypropyl)-phosphonic acid at 0° C. and lowering the temperature of the mixture to —20° C. to —40° C. The crystalline (—) enantiomer is isolated at the sub-zero temperature by filtration. Any remaining solvent is removed from (—)(cis-1,2-epoxypropyl)-phosphonic acid by drying in vacuo below 40 microns pressure.

The best mode contemplated by application for carrying out this invention is more fully illustrated in the following examples. It is to be understood that no limitation is implied or intended except as set forth in the appended claims.

EXAMPLE 1

Ten grams of (±)(cis-1,2-epoxypropyl)-phosphonic acid are dissolved in 25 ml. of tetrahydrofuran at 0° C. Diethyl ether is added to the cloud point of the solution. One gram of finely pulverized crystalline (—)(cis-1,2-epoxypropyl)-phosphonic acid is added and the mixture is cooled to —20° C. with rapid stirring. After a few minutes the precipitate is filtered, washed with tetrahydrofuran-diethylether at —20° C., and then dried in vacuo below 40 microns, keeping at or below —20° C. until full vacuum has been applied. The product consists, in addition to the seed crystals, of 1–5 grams of crystalline (—)(cis-1,2-epoxypropyl)-phosphonic acid. The (—) enantiomer melts instantly at temperatures above about 94° C. when placed in a preheated oil bath at this temperature or above. When the melting point is determined by heating the sample from room temperature, even when heating at the rate of 60° C./min., no melting is observed even upon heating to 170° C.

EXAMPLE 2

The procedure of Example 1 is repeated employing the same conditions and quantities except that 50 ml. of dioxane is employed in place of 25 ml. of tetrahydrofuran. The (—)(cis-1,2-epoxypropyl)-phosphonic acid obtained is comparable to the product afforded in Example 1.

The subject matter which applicant regards as his invention is particularly pointed out and distinctly claimed as follows.

What is claimed is:

1. A process for the direct resolution of ($\pm$)(cis-1,2-epoxypropyl)-phosphonic acid into the (+) and (−) enantiomers thereof that comprises:
    (a) dissolving ($\pm$)(cis-1,2-epoxypropyl)-phosphonic acid in tetrahydrofuran or dioxane and mixtures thereof at 0° C.;
    (b) adding thereto a miscible non-solvent to the cloud point of the solution;
    (c) adding crystalline (−)(cis-1,2-epoxypropyl)-phosphonic acid and cooling the solution to from −20° C. to −40° C.;
    (d) isolating the crystalline (−)(cis-1,2-epoxypropyl)-phosphonic acid.

2. The process of claim 1 wherein the miscible non-solvent is diethylether.

References Cited
UNITED STATES PATENTS 3,496,080  2/1970  Harris _____ 204—158

OTHER REFERENCES

A. Weissberger, Technique of Org. Chemistry, vol. III (1950) pp. 408–13, p. 480.

H. Gilman, Organic Chemistry, vol. I (1948) pp. 254–6.

NORMA S. MILESTONE, Primary Examiner